Oct. 15, 1963  A. A. MEDDOCK  3,107,079
FLUID METERING SHUT-OFF VALVE
Original Filed May 6, 1957

INVENTOR.
ALVIN A. MEDDOCK
BY
William P. Hickey
ATTORNEY 3,107,079
FLUID METERING SHUT-OFF VALVE
Alvin A. Meddock, Van Nuys, Calif., assignor to The Bendix Corporation, North Hollywood, Calif., a corporation of Delaware
Continuation of application Ser. No. 657,270, May 6, 1957. This application July 3, 1961, Ser. No. 121,679
1 Claim. (Cl. 251—16)

The present invention relates to flow metering devices and more particularly to a type of flow metering device which will accurately meter fluid under changing viscosity conditions. This application for patent is a continuation of my copending application Serial No. 657,270, filed May 6, 1957, now abandoned.

An object of the present invention is the provision of a new and improved flow metering device of the above described type which is simple in construction, reliable in operation and inexpensive to manufacture.

Another object of the invention is the provision of a new and improved flow control device comprising a flow control passageway and a bypass passageway each of which passageways are provided with flow restricting plates made from material of substantially the same thickness and each of which are provided with a number of substantially identically sized and shaped flow restricting openings therethrough.

A further object is the provision of a new and improved flow metering device of the above described type in which the flow restricting plates are made readily removable such that the flow metering characteristics of the device can be quickly and easily changed by the substituting of plates having a different number of flow restricting openings therethrough.

A more particular object of the invention is the provision of a new and improved flow metering valve for controlling a positive displacement device and comprising means forming a first flow path through the valve, an expansible chamber having a movable wall thereof adapted to close off said flow path after having been displaced by a predetermined volume of fluid, means communicating said expansible chamber with an external reservoir, and a flow restricting plate in each of said flow communicating means, said plates being of substantially the same thickness and being provided with holes of substantially the same size and shape.

A still further object of the invention is the provision of a new and improved flow metering valve of the above described type in which the flow restricting plate to the valve's expansible chamber is biased against a retaining seat when flow is being metered through the valve and which is forced off of its seat during flow from the control device to assure proper repositioning of its fluid displacement member.

The invention resides in certain constructions and combinations and arrangements of parts, and further objects and advantages will become apparent to those skilled in the art to which the invention relates from the following description of the preferred embodiment described with reference to the accompanying drawing forming a part of this specification, and in which.

Figure 1:
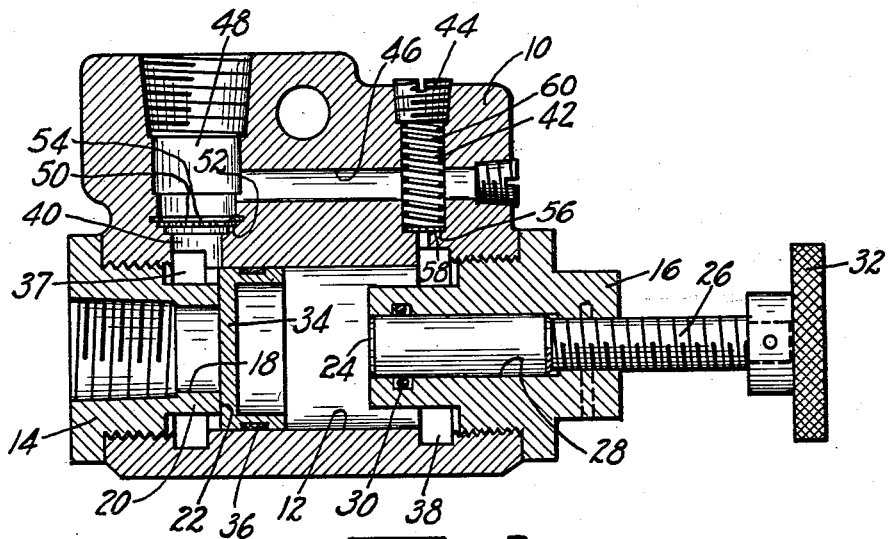
FIGURE 1 is a cross-sectional view of a flow metering valve embodying principles of the present invention.
Figure 2:
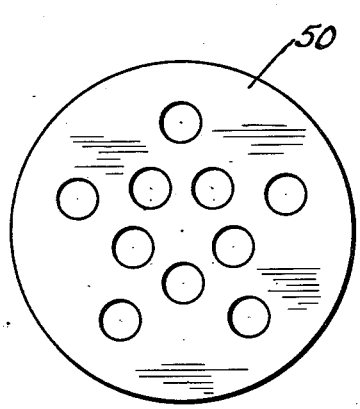
FIGURE 2 is a plan view of a bypass orifice plate used therein.
Figure 3:
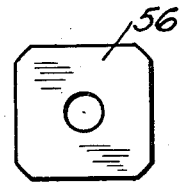
FIGURE 3 is a plan view of a control orifice plate used therein.

The flow metering valve shown in FIGURE 1 is specifically designed to meter flow to one side of a power lift cylinder such that a predetermined amount of movement will be achieved by the power cylinder when flow is established through the metering valve in one direction, and such that the power lift cylinder and the metering valve will return to their original conditions when flow is permitted in the reverse direction through the flow metering valve. The flow metering valve generally comprises a body member 10 having an axially extending bore 12 therethrough, opposite ends of which bore are closed off by the threaded closure members 14 and 16. The end closure member 14 is provided with an axially extending outlet port 18, the inner end of which is surrounded by an annular boss 20 which projects into the bore 12 and terminates in a valve seat 22. The opposite end closure member 16 is provided with an adjustable abutment formed by means of a rod 26 having an adjustable abutment 24 extending through an axial opening 28 in the closure member 16, and the center section of which rod threadedly engages the outer end of the closure member 16. Suitable sealing means 30 is provided between the rod 26 and closure member 16 inwardly of their threaded connection, and an adjustment knob 32 is provided on the outer projection of the adjustment rod. A movable wall or piston 34 is positioned in the axially extending bore 12 between the end closure member 14 and the adjustable abutment 24, and a suitable seal 36 is provided on the radially outer surface of the piston 34 to substantially isolate the variable volume chambers 37 and 38 formed on either side thereof.

In the normal condition of the valve, the movable wall or piston 34 will be in engagement with the adjustable abutment 24. A fluid inlet connection 40 is provided for the variable volume chamber 37 to establish a flow path through the metering valve. The inlet passageway 40 is formed by a radial drilling which intersects the axially extending bore 12 at a point behind the valve seat 22, such that it will not be closed off when the piston 34 is in engagement with the valve seat 22. A second fluid inlet passageway 42 is also provided in the valve for providing fluid communication with the opposing variable volume chamber 38. The inlet passageway 42 is formed by means of a radial drilling which intersects the axially extending bore 12 at a point outwardly from the inner end of the adjustable abutment 24, such that the piston 34 will at no time close off communication between the inlet passageway 42 and the chamber 38. The outer end of the passageway 42 is closed off by means of a pipe plug 44, and a longitudinal drilling 46 is provided in the body member 10 to permit the two inlet passageways 40 and 42 to be supplied with inlet pressure from a common external connection.

In order that the inlet flow to the variable volume chamber 37 will be accurately metered, a flow restricting plate 50 is positioned between the cross drilling 46 and the longitudinal extending bore 12. The plate 50 is seated against a shoulder 52 formed by means of a counterbore in the outer end of the passageway 40, and is held in place by means of a snap ring 54. Flow is likewise metered to the opposing variable volume fluid chamber 38 by a flow restricting plate 56 seated against a shoulder 58 formed by means of a counterbore in the outer end of the passageway 42. The flow restricting plate 56 is squared off on four sides to provide segmental openings between its side edges and the side walls of the counterbore, and the plate 56 is held in place by means of a coil spring 60 positioned between the plate and the pipe plug 44. Return flow from the variable volume chamber 38 is therefore free to lift the plate 56 from the shoulder 58 and permit the return flow to proceed around the side edges of the plate 56 in a substantially unrestricted manner. Suitable openings are provided in each of the flow restricting plates 50 and 56 such that when fluid inlet pressure is supplied to the common inlet connection 48, parallel flow paths are established with respect to the opposing variable volume chambers 37 and 38. The quantity of fluid passing through the flow restricting plate 50 proceeds through the chamber 37 directly to the outlet port 18 and to the controlled device. Simultaneously therewith fluid passes through the flow restricting plate 56 in a metered amount with respect to that passing through the flow restricting plate 50 to displace the movable wall or piston 34 from the adjustable abutment 24 toward the outlet valve seat 22. After a metered amount of inlet fluid has been admitted to the chamber 38, the piston 34 is forced into sealing engagement with the valve seat 22 to thereafter prevent further flow through the metering valve. Return movement of the control device is accomplished by releasing pressure upon the common inlet connection 48, whereupon return force exerted against the controlled device forces the fluid previously supplied thereto back through the metering valve. Return pressure in the outlet port 18 forces the piston 34 out of engagement with its valve seat 22 permitting the return fluid to be throttled across the flow restricting plate 50. At the same time, fluid pressure upon the piston 34 forces the piston towards the adjustable abutment 24, thereby displacing the fluid contained within the variable volume chamber 38 out of its inlet passageway 42 to the downstream side of the flow restricting plate 50. The differential pressure established across the flow restricting plate 50 by the fluid return flow will normally be sufficient to cause the flow restricting plate 56 to be lifted from engagement with its shoulder 58, such that the return flow through the control inlet passageway 42 will proceed at a faster rate relative to the bypass flow through passageway 40 than was experienced initially. This assures that the piston 34 will be forced into engagement with the adjustable abutment 24 by the time the metered amount of flow has returned through outlet port 18.

The above construction is believed to have particular advantages in those applications where there is a need for frequently changing the amount of fluid to be metered. It will be apparent that the flow restricting plates 50 and 56 can be easily removed from the valve body and replaced with plates having different flow restricting areas therein. This can be accomplished in some instances by merely drilling additional holes in the flow restricting plate 50, or alternatively by enlarging the holes in either of the plates. As a further refinement of the invention, the flow restricting holes in the flow restricting plates 50 and 56 will preferably be made of the same size, and the plates 50 and 56 will preferably be made from the same thickness of material. Identical flow characteristics will therefore be established for the flow metering openings in the two flow restricting plates 50 and 56 such that a change in the viscosity, temperature or density of the fluid will change the quantity passing through the individual openings of each plate by a like amount. It will be apparent therefore that the quantity of fluid passed by each of the flow restricting plates will remain in predetermined proportion to each other—notwithstanding changing conditions of the fluid being metered; and that this fixed proportion will be a function of the number of holes in the respective plates.

While the invention has been described in considerable detail, I do not wish to be limited to the particular constructions shown and described and it is my intention to cover hereby all novel adaptations, modifications, and arrangements thereof which come within the practice of those skilled in the art to which the invention relates.

I claim:

A flow metering valve comprising: a valve body having an axially extending chamber therethrough, a first closure member in one end of said chamber and having an outlet port therein, a seat surrounding said outlet port, a second closure member in the other end of said chamber and having a movable abutment therein, a movable wall in said chamber forming opposing variable volume chambers and adapted to move between and engage said abutment and said seat for closing off said outlet port, means for varying the distance between said abutment and said seat, a first generally radial inlet passageway communicating the variable volume chamber having said outlet port with the external surface of said valve, a second generally radial inlet passageway communicating the variable volume chamber having said abutment with the external surface of said valve, said passageways being counterbored from the outside to provide a shoulder in each passageway, first and second removable flow restricting plates seated against the shoulder in respective counterbores, said plates being of substantially the same thickness and having holes therein of substantially the same size and shape, and said second plate and its cooperating shoulder being constructed and arranged such that flow out of said second variable volume chamber lifts said second plate from its cooperating shoulder to permit flow out of said second chamber to pass around said second plate, whereby the flow out of said outlet port is metered and the lifting of said second plate assures that said movable wall is returned to its position adjacent said abutment during return flow through said outlet port.

References Cited in the file of this patent

UNITED STATES PATENTS

| | | |
|---|---|---|
| 1,846,483 | Gilbert | Feb. 23, 1932 |
| 2,796,080 | Presnell | June 18, 1957 |
| 2,853,159 | Kuhn | Sept. 23, 1958 |
| 2,923,277 | Waterman | Feb. 2, 1960 |